(12) United States Patent
Williams et al.

(10) Patent No.: US 8,589,042 B2
(45) Date of Patent: Nov. 19, 2013

(54) SYSTEM AND METHOD FOR ADAPTIVE TRANSMISSION CLUTCH TORQUE CONTROL

(75) Inventors: Robert L. Williams, Holly, MI (US);
Matthew D. Whitton, Howell, MI (US);
Kurt Mitts, Santa Monica, CA (US);
Daniel Deras, Brighton, MI (US)

(73) Assignee: GM Global Technology Operations LLC

( * ) Notice: Subject to any disclaimer, the term of this patent is extended or adjusted under 35 U.S.C. 154(b) by 122 days.

(21) Appl. No.: 13/181,897

(22) Filed: Jul. 13, 2011

(65) Prior Publication Data

US 2013/0018556 A1    Jan. 17, 2013

(51) Int. Cl.
*G06F 7/00* (2006.01)
*G06F 17/00* (2006.01)
*G06F 19/00* (2011.01)

(52) U.S. Cl.
USPC ............ 701/60; 701/51; 701/67; 701/68; 471/169; 471/176

(58) Field of Classification Search
USPC ............ 701/51, 48, 60, 67, 68; 477/169, 176
See application file for complete search history.

(56) References Cited

U.S. PATENT DOCUMENTS

| | | | |
|---|---|---|---|
| 5,029,494 A * | 7/1991 | Lentz et al. | 477/148 |
| 5,588,937 A * | 12/1996 | Kono et al. | 477/169 |
| 6,733,299 B2 * | 5/2004 | Eguchi et al. | 477/176 |
| 7,590,480 B2 * | 9/2009 | Dlugoss | 701/51 |
| 7,641,031 B2 * | 1/2010 | Nakamura et al. | 192/3.31 |
| 7,641,587 B2 * | 1/2010 | Jess et al. | 477/97 |
| 7,837,589 B2 | 11/2010 | Earhart | |
| 8,075,437 B2 * | 12/2011 | Rodgers, II | 475/211 |
| 8,108,089 B2 * | 1/2012 | Hasegawa et al. | 701/22 |
| 2009/0203483 A1 * | 8/2009 | Earhart | 475/207 |
| 2010/0078287 A1 * | 4/2010 | Gaffney et al. | 192/107 M |

* cited by examiner

*Primary Examiner* — Khoi Tran
*Assistant Examiner* — Rachid Bendidi

(57) ABSTRACT

A control system for a transmission includes a memory module, a position module, an error module, an integral module, and an adjustment module. The memory stores a control value as a function of clutch torque. The position module controls a position of a clutch based on the control value. The error module periodically determines a slip speed error based on a difference between a target slip speed and an estimated slip speed of the clutch. The integral module periodically determines an integral of the slip speed error. The adjustment module adjusts the control value based on the integral. A method for controlling a transmission is also provided.

20 Claims, 8 Drawing Sheets

SYSTEM AND METHOD FOR ADAPTIVE TRANSMISSION CLUTCH TORQUE CONTROL

FIELD

The present disclosure relates to control systems and methods for transmissions, and more particularly, to systems and method for clutch control in dual-clutch transmissions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles typically include an engine that produces drive torque which is transmitted to one or more wheels through a transmission at various gear ratios. Dual-clutch transmissions generally include an input shaft, an output shaft, two counter shaft gear arrangements, and two clutches. Each of the two gear arrangements is coupled to the output shaft and includes one or more gear sets for transferring torque at various gear ratios. Each of the two clutches couples the input shaft to a corresponding one of the two gear arrangements. During operation, the two clutches are selectively actuated to transmit torque between the input shaft and the output shafts at the various gear ratios via the two gear arrangements.

Transmission control systems have been developed to control operation of the clutches. Specifically, clutch position, clutch torque, and/or clutch slip may be controlled. Some transmission control systems enable the engaged clutch to slip during periods when the transmission is operated in a selected gear. Clutch slip occurs when an amount of torque transmitted by the clutch (i.e., clutch torque) is less than an input torque. The engaged clutch may be allowed to slip to improve clutch response when disengaging the engaged clutch to shift into another gear. In such systems, clutch slip may be controlled by controlling clutch torque. Clutch torque may be controlled by controlling clutch position based on a predetermined clutch torque to position relationship.

SUMMARY

In one form, the present disclosure provides a control system for a transmission that includes a memory module, a position module, an error module, an integral module, and an adjustment module. The memory stores a control value as a function of clutch torque. The position module controls a position of a clutch based on the control value. The error module periodically determines a slip speed error based on a difference between a target slip speed and an estimated slip speed of the clutch. The integral module periodically determines an integral of the slip speed error. The adjustment module adjusts the control value based on the integral.

In various features, the control value is stored as a function of clutch torque and a clutch parameter other than clutch torque. In related features, the clutch parameter is clutch interface temperature. In further features, the adjustment module adjusts the control value based on a value of the integral when a predetermined operating condition is met for a predetermined period. In related features, the operating condition specifies one of a clutch slip speed range, a clutch torque range, and a transmission input torque range.

In still further features, the memory module stores a first control value and a second control value, and the adjustment module adjusts at least one of the first control value and the second control value. The first control value is stored as a function of clutch torque and a clutch parameter other than clutch torque. The second control value is stored as a function of clutch torque and the clutch parameter and is different than the first control value. The adjustment module adjusts at least one of the first control value and the second control value based on (i) a value of the integral when a predetermined operating condition is met for a predetermined period and (ii) an estimated value of the clutch parameter during the period. In a related feature, the first control value is stored as a function of a first reference value, and the second control value is stored as a function of a second reference value different than the first reference value. The adjustment module adjusts the first control value and the second control value based on a difference between (i) the estimated value and (ii) one of the first reference value and the second reference value.

In yet further features, the adjustment module adjusts the control value when a value of the integral is greater than a predetermined value. In other features, the adjustment module adjusts the control value by a first quantity, and the adjustment module adjusts the integral by a second quantity based on the first quantity. In still other features, the control value corresponds to a linear operating range of the clutch.

In another form, the present disclosure provides a method for controlling a transmission. The method includes: (i) storing a control value as a function of clutch torque, (ii) controlling a position of a clutch based on the control value, (iii) periodically determining a slip speed error based on a difference between a target slip speed and an estimated slip speed of the clutch, (iv) periodically determining an integral of the slip speed error, and (v) adjusting the control value based on the integral. In various features, the method further includes storing the control value as a function of a clutch parameter other than clutch torque. In related features, the clutch parameter is clutch interface temperature.

In further features, the method further includes adjusting the control value based on a value of the integral when a predetermined operating condition is met for a predetermined period. In related features, the operating condition specifies one of a clutch slip speed range, a clutch torque range, and a transmission input torque range. In still further features, the method further includes: (i) storing a first control value as a function of clutch torque and a clutch parameter other than clutch torque, (ii) storing a second control value as a function of clutch torque and the clutch parameter, the second control value being different than the first control value, and (iii) adjusting at least one of the first control value and the second control value based on (a) a value of the integral when a predetermined operating condition is met for a predetermined period and (b) an estimated value of the clutch parameter during the period. In related features, the method further includes: (i) storing the first control value as a function of a first reference value, (ii) storing the second control value as a function of a second reference value different than the first reference value, and (iii) adjusting the first control value and the second control value based on a difference between (a) the estimated value and (b) one of the first reference value and the second reference value.

In yet further features, the method further includes adjusting the control value when a value of the integral is greater than a predetermined value. In other features, the method further includes: (i) adjusting the control value by a first quantity, and (ii) adjusting the integral by a second quantity based on the first quantity. In still other features, the control value corresponds to a linear operating range of the clutch.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
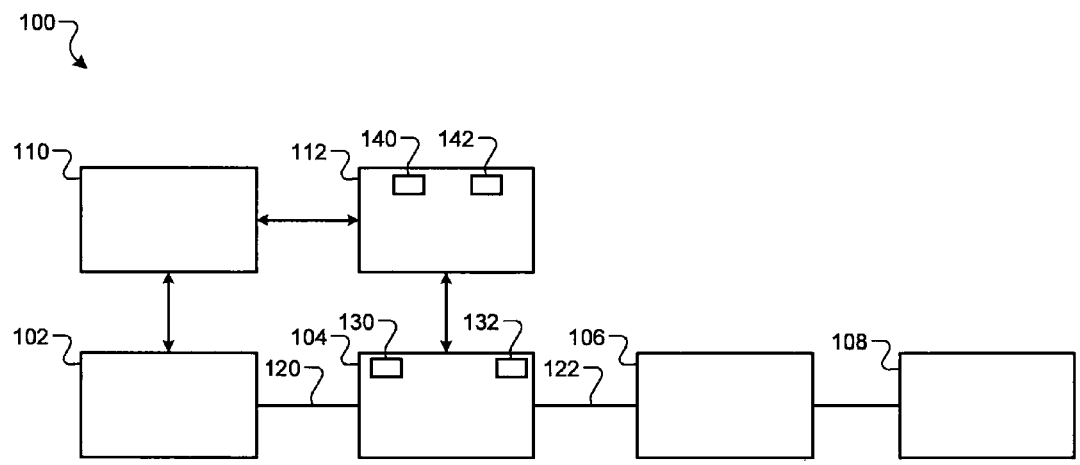
FIG. 1 is a functional block diagram illustrating an exemplary powertrain system for a vehicle according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A torque to position (T2P) relationship of a clutch in a transmission may be different than a predetermined T2P relationship used to control the clutch due to variation in the clutches and other components of the transmission, as well as variation in transmission assembly. The T2P relationship may also vary over time due to clutch wear and wear in other components of the transmission, such as clutch apply components. Differences between the T2P relationship and the predetermined T2P relationship may result in slip speed error when controlling clutch slip. The slip speed error may be controlled using a control loop feedback system. For example, the control loop feedback system may output a correction to a clutch torque command based on the slip speed error.

The present disclosure provides an exemplary control system and method for selectively updating a T2P relationship used to control a clutch in a dual-clutch transmission. The T2P relationship is expressed by T2P control values stored in memory. The system includes a control loop feedback system that corrects slip speed error using an integral gain. The system selectively updates the T2P control values based on a value of the integral gain after predetermined operating conditions have been met for a predetermined period. In this way, the system may periodically learn a unique T2P relationship for a clutch and update the T2P relationship over time. By updating the T2P relationship, improved clutch control, and more particularly, improved clutch slip control may be achieved. While the control system and method are described for a dual-clutch transmission, it will be appreciated that the teachings of the present disclosure can be readily applied to control clutches in other semi-automatic transmission configurations, as well as automatic transmission configurations. As one example, the present teachings can be applied to what may be referred to as a manual clutch automatic transmission.

With particular reference to FIG. 1, a functional block diagram illustrates an exemplary powertrain system 100 for a vehicle. The powertrain system 100 includes a powerplant 102, a dual-clutch transmission (DCT) 104, and a driveline 106 for driving one or more wheels 108 of the vehicle. The powertrain system 100 further includes a powerplant control module (PCM) 110 and a transmission control module (TCM) 112. The powerplant 102 produces drive torque that is transmitted to the DCT 104 and can be one of several types. For example, the powerplant 102 can be a hybrid powerplant including an internal combustion engine that produces torque used alone or in combination with torque produced by an electric motor. Alternately, the powerplant 102 can include and internal combustion engine or an electric motor that alone produces the drive torque. The PCM 110 controls the drive torque output by the powerplant 102 based on inputs including various driver inputs, vehicle operating conditions, and control parameters, for example.

The DCT 104 receives the drive torque output by the powerplant 102 and selectively transfers the drive torque to the driveline 106. More specifically, the DCT 104 receives the drive torque via an input shaft 120 and transfers torque to an output shaft 122 at one of multiple gear ratios. A gear ratio (or drive ratio) may be defined as a ratio of a first rotational speed of the input shaft 122, or input shaft speed, to a second rotational speed of the output shaft 122, or output shaft speed. The DCT 104 transfers the torque at various gear ratios by selectively transferring the torque through a first (C1) clutch 130 and a second (C2) clutch 132. In various implementations, the C1 and C2 clutches 130, 132 may be dry clutches biased in a disengaged position and moved between the disengaged position and an engaged position (i.e., actuated) using pressurized fluid within the DCT 104. The TCM 112 controls operation of the DCT 104, including a gear ratio at which the torque is transmitted and operation of the C1 and C2 clutches 130, 132. The TCM 112 controls operation based on inputs including various driver inputs, vehicle operating conditions, and control parameters, for example. The TCM 112 includes a memory module 140 and a clutch control module 142 that controls operation of the C1 and C2 clutches 130, 132 according to the present disclosure, as discussed in further detail below.

The driveline 106 receives the torque output by the DCT 104 and transfers the torque to the wheels 108. The present disclosure is not limited to drivelines of a particular configuration. For example, the driveline 106 may include a differential (not shown) and one or more drive shafts (not shown) for coupling the differential to the DCT 104 and the wheels 108. In various implementations, the differential may be implemented within the DCT 104, such as in front-wheel drive implementations.

Figure 2:
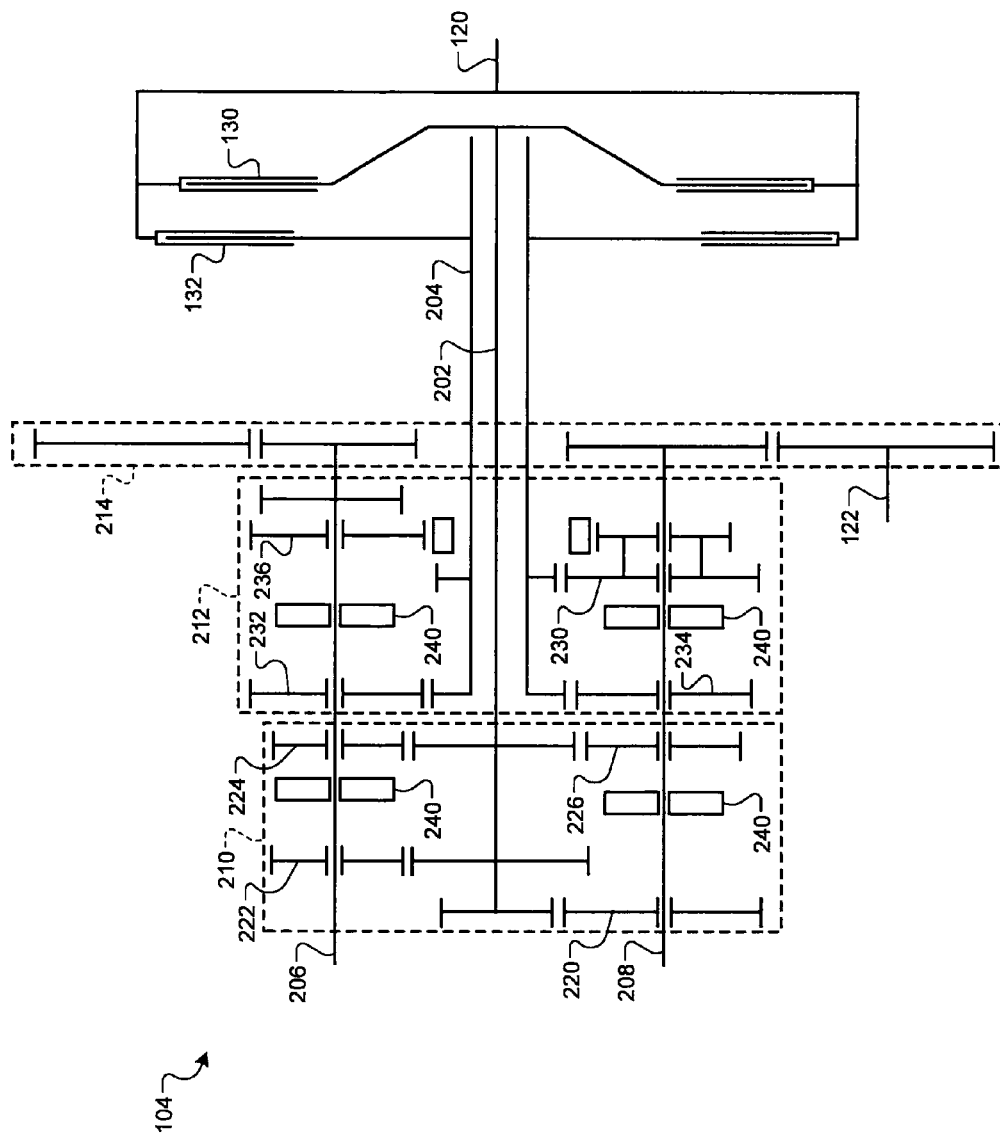
FIG. 2 is a schematic diagram illustrating an exemplary dual-clutch transmission according to the present disclosure.

With particular reference to FIG. 2, a schematic diagram illustrates an exemplary implementation of the DCT 104 according to the present disclosure. The DCT 104 presented is a seven-speed transmission providing seven forward gear ratios and one reverse gear ratio. The DCT 104 includes a first intermediate input shaft 202, a second intermediate input shaft 204, a first counter shaft 206, a second counter shaft 208, and gear sets 210, 212, 214. The first intermediate input shaft 202 and the second intermediate input shaft 204 are coupled to the input shaft 120 via the C1 clutch 130 and the C2 clutch 132, respectively. The first intermediate input shaft 202 may be supported for rotation within the second intermediate input shaft 204 about a common axis of rotation. The first and second counter shafts 206, 208 are radially offset from and extend parallel to the first and second intermediate input shafts 202, 204.

The gear sets 210, 212, 214 each include pairs of input gears and output gears, which may also be referred to as a gear set. In various configurations, the input and output gear sets may include spur gears and/or helical gears. When engaged, each of the input and output gear sets provides a unique gear ratio at which torque may be transmitted from one of the first and second intermediate input shafts 202, 204 to one of the first and second counter shafts 206, 208.

The gear set 210 includes input gears fixed for rotation with the first intermediate input shaft 202 and output gears fixed for rotation with the first and second counter shafts 206, 208 as shown. The gear set 210 includes odd gear sets 220, 222, 224, 226 providing gear ratios corresponding to a first gear, a third gear, a fifth gear, and a seventh gear, respectively. The gear sets 212 include input gears fixed for rotation with the second intermediate input shaft 204 and output gears fixed for rotation with the first and second counter shafts 206, 208, as shown. The gear set 212 includes even gear sets 230, 232, 234 providing gear ratios corresponding to a second gear, a fourth gear, and a sixth gear, respectively. The gear set 212 further includes a reverse gear set 236 providing a reverse gear.

Synchronizers 240 are disposed on and axially moveable along the first and second counter shafts 206, 208. The synchronizers 240 are operable to selectively engage and disengage the input and output gears of the gear sets 210, 212 and thereby mechanically couple the first and second intermediate input shafts 202, 204 with the first and second counter shafts 206, 208. The gear set 214 includes input gears fixed for rotation with the first and second counter shafts 206, 208 and an output gear fixed for rotation with the output shaft 122. In various arrangements, the input and output gears of the gear set 214 may include a planetary gear set.

Figure 3:
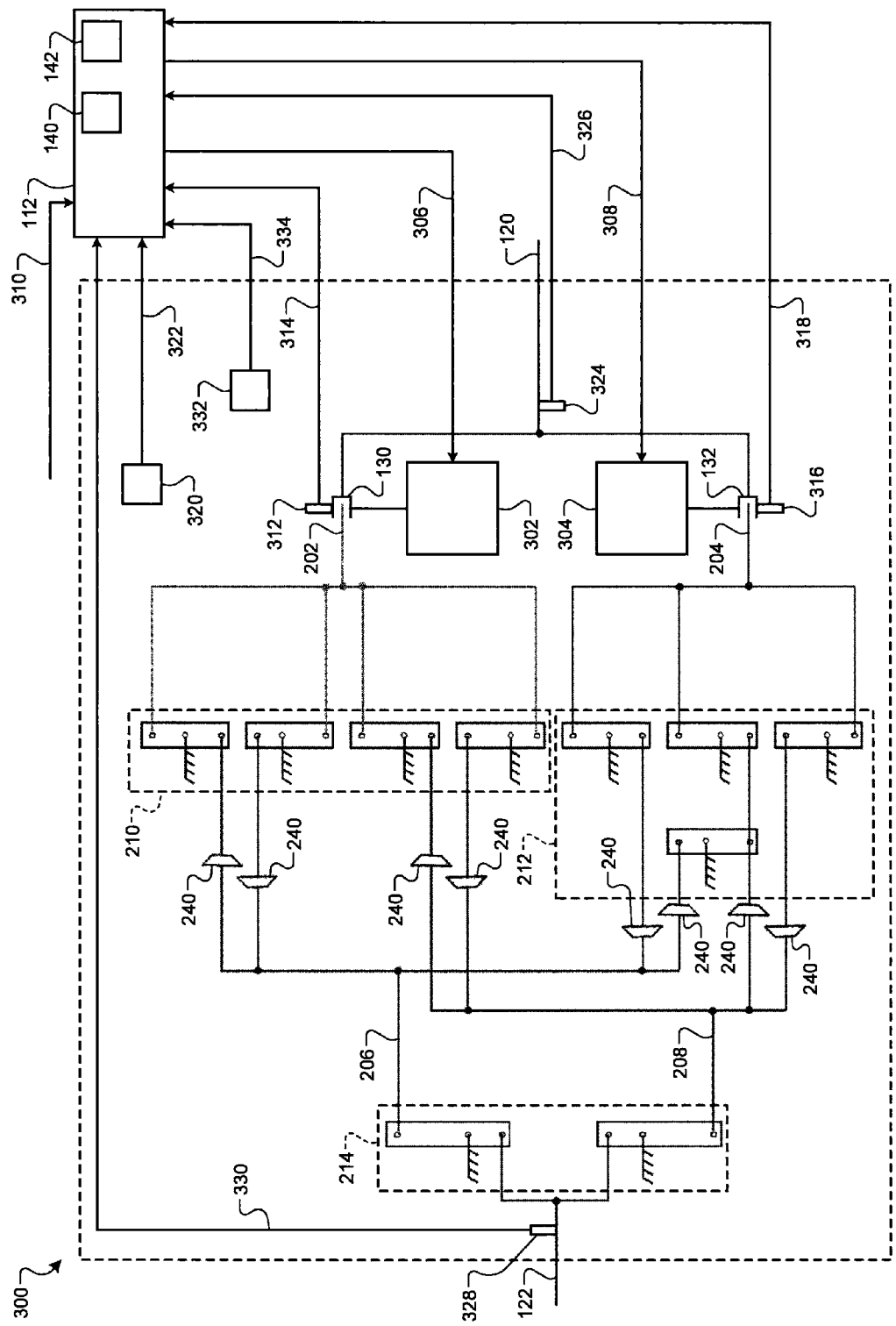
FIG. 3 is a functional block diagram illustrating an exemplary transmission control system according to the present disclosure.

With particular reference to FIG. 3, a functional block diagram illustrates an exemplary implementation of the TCM 112 in a transmission control system 300 according to the present disclosure. The TCM 112 controls operation of the C1 clutch 130 and the C2 clutch 132 via a first clutch (C1) actuator module 302 and a second clutch (C2) actuator module 304, respectively. The C1 actuator module 302 controls the C1 clutch 130, and more particularly clutch position, based on clutch control values communicated by the TCM 112 in a first clutch (C1) signal 306. The C2 actuator module 304 controls the C2 clutch 132, and more particularly clutch position, based on clutch control values communicated by the TCM 112 in a second clutch (C2) signal 308. For example, only the C1 and C2 control modules 302, 304 may control the C1 and C2 clutch positions by controlling pressures and/or volumes of a hydraulic fluid supplied to clutch apply components of the C1 and C2 clutches 130, 132.

The TCM 112 controls operation based on various operating parameters including, but not limited to, drive torque, transmission gear ratio, transmission speed, transmission temperature, and clutch slip speed. The TCM 112 may receive an estimated drive torque output by the powerplant 102 in a drive torque signal 310 from the PCM 110. For example, the PCM 110 may periodically estimate the torque output by the powerplant 102 and output the estimated torque output in the drive torque signal 310. The TCM 112 may determine a gear ratio in which the DCT 104 is operating by measuring positions of the C1 and C2 clutches 130, 132 and the gear sets 210, 212. A first (C1) position sensor 312 may measure a clutch position of the C1 clutch 130 and generate a first clutch (C1) position signal 314 indicative of the C1 clutch position. A second (C2) position sensor 316 may measure a clutch position of the C2 clutch 132 and generate a second clutch (C2) position signal 318 indicative of the C2 clutch position. Position sensors 320 may sense axial positions of the synchronizers 240 and generate sensor signals 322 indicative of the axial positions. The position sensors 320 may sense the axial positions of the synchronizers by sensing positions of forks (not shown) used to move the synchronizers 320 along the first and second counter shafts 206, 208.

A transmission input shaft speed (TISS) sensor 324 may measure a rotational speed of the input shaft 120 (transmission input shaft speed) and generate a TISS signal 326 indicative of transmission input shaft speed. A transmission output shaft speed (TOSS) sensor 328 may measure a rotational speed of the output shaft 122 (transmission output shaft speed) and generate a TOSS signal 330 indicative of the transmission output shaft speed. A transmission temperature sensor 332 may measure a transmission temperature and output a transmission temperature signal 334 indicative of the transmission temperature. In an exemplary implementation, the temperature sensor 332 may measure a temperature of the hydraulic fluid within the DCT 104 used to actuate C1 and C2 clutches 130, 132.

With continued reference to FIGS. 1 and 3, the memory module 140 includes nonvolatile memory where various clutch control values used by the clutch control module 142 are stored. The memory module 140 includes memory tables defining T2P relationships of the C1 and C2 clutches 130, 132. The memory tables include unique memory tables for each of the N clutches operated to achieve a target slip speed during steady-state operation. Each table is assigned and identified by a unique clutch index number. For each of the N clutches, the memory tables may further include a unique table for M clutch operating parameters, including a dominant clutch operating parameter.

The dominant clutch operating parameter can be predetermined, for example, during a development phase of transmission design, based on transmission testing over various ranges in various clutch operating parameters. In various implementations, clutch interface (CI) temperature may be the dominant clutch operating parameter affecting the T2P relationship. As used herein, CI temperature generally refers to a temperature at an interface between the friction engaging members of a clutch. According to the present non-limiting example, the memory module 140 includes a single memory table for each of the first and second clutches 130, 132 (N=2) defining T2P relationships over an expected range of CI temperature (M=1). Accordingly, the memory module 140 includes N times M T2P memory tables, or two T2P memory tables. Each of the T2P memory tables includes a family of T2P curves defining T2P characteristics at various predetermined, discrete reference CI temperatures. A number X of T2P curves may be based on the expected range in the CI temperature during operation and other considerations, for example, system performance and computing power.

Figure 4:
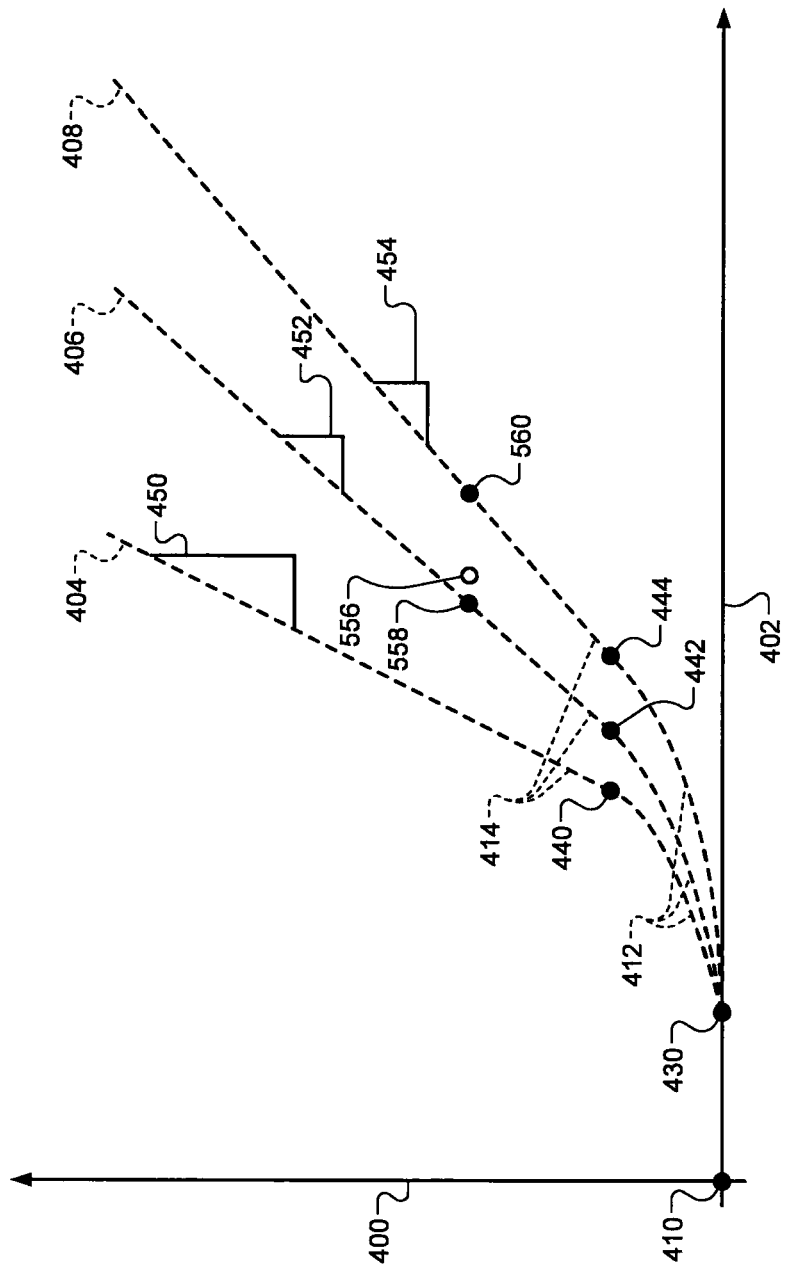
FIG. 4 is a chart of clutch torque versus position illustrating clutch control parameters according to the present disclosure.

With particular reference to FIG. 4, a chart of clutch torque on a first axis 400 versus clutch position on a second axis 402 illustrates an exemplary family of three T2P curves 404, 406, 408. For reference, the axes 400, 402 are located at a fully disengaged or open clutch position designated by a point identified by reference numeral 410 where the clutch torque is zero. The first T2P curve 404 corresponds to a relatively cold reference CI temperature (T1) of, for example, minus twenty degrees Celsius (−20° C.). The second T2P curve 406 corresponds to an expected or nominal reference CI temperature (T2) of, for example, seventy-five degrees Celsius (75° C.). The third T2P curve 408 corresponds to a relatively hot reference CI temperature (T3) of, for example, one hundred and twenty degrees Celsius (120° C.). Generally, the T2P curves 404, 406, 408 include non-linear regions or operating ranges 412 and a linear regions or operating ranges 414.

The T2P curves 404, 406, 408 are defined by a single T2P engagement point 430, T2P offset points 440, 442, 444, and T2P gains 450, 452, 454. The T2P engagement point 430 corresponds to a clutch position at which the friction disks first engage one another, which may be referred to as a kiss point, and the non-linear operating ranges 412 begin. The T2P engagement point 430 defines a clutch position at which the clutch begins to transmit torque. The T2P engagement point 430 may be expressed as a position in units of millimeters (mm) at a torque of zero in units of Newton-meters (N-m). The T2P offset points 440, 442, 444 correspond to clutch positions at which the non-linear operating ranges 412 end and the linear operating ranges 414 begin. The T2P offset points 440, 442, 444 define minimum clutch torques at which the respective T2P relationships exhibit a linear relationship. The T2P offset points 440, 442, 444 may be expressed as positions in units of mm and torques in units of N-m. The T2P gains 450, 452, 454 express slopes or gradients of the respective linear operating ranges 414. The T2P gains 450, 452, 454 may be expressed in units of N-m per mm (N-m/mm). Together, the T2P offset points 440, 442, 444 and the respective T2P gains 450, 452, 454 define the T2P relationships within the linear operating ranges 414 of the clutch. Non-linear equations defining the T2P relationships within the non-linear operating ranges 412 may be a function of the T2P engagement point 430 and the respective T2P offset points 440, 442, 444.

Initially, predetermined T2P engagement points, predetermined T2P offset points, and predetermined T2P gains are stored in each of the memory tables. The T2P engagement points, T2P offset points, and T2P gains can be predetermined, for example, during a calibration phase of transmission design, based on transmission testing in each of the N transmission gears over an expected range in CI temperature. During operation, the T2P offset points are selectively adjusted as discussed in further detail below.

Figure 5:
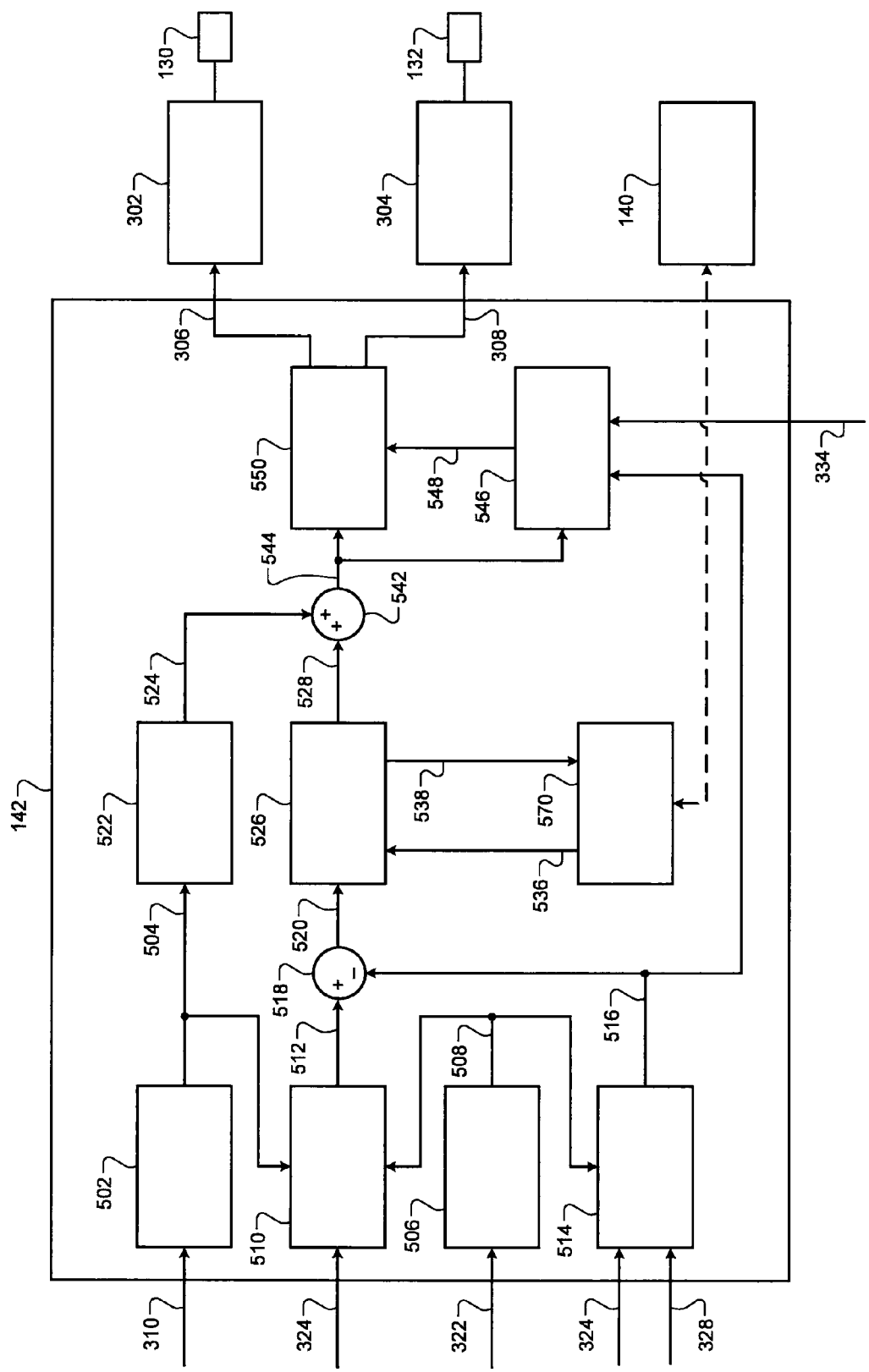
FIG. 5 is a functional block diagram illustrating an exemplary clutch control module according to the present disclosure.

With particular reference to FIG. 5, a functional block diagram illustrates an exemplary implementation of the clutch control module 142 according to the present disclosure. The clutch control module 142 includes various modules that, together with the memory module 140, implement the system and method of the present disclosure. Generally, the clutch control module 142 controls the C1 and C2 clutch positions during steady-state operation of the DCT 104. As used herein, steady-state operation generally refers to operation during periods between up shifts and down shifts (i.e., gear changes). The clutch control module 142 periodically determines a C1 clutch position and a C2 clutch position and outputs the C1 and C2 clutch positions as clutch control values to the C1 and C2 actuator modules 302, 304, respectively. The clutch control module 142 outputs the C1 and C2 clutch positions in the C1 and C2 signals 306, 308.

The clutch control module 142 determines the C1 and C2 clutch positions and thereby controls clutch slip based on stored T2P control values. The clutch control module 142 implements a proportional-integral (PI) control loop feedback system that uses a measured slip speed error to correct a feed forward clutch torque. The clutch control module 142 periodically determines a proportional gain and an integral gain and uses the gains to correct the feed forward clutch torque. The clutch control module 142 selectively adjusts the stored T2P control values based on the integral gain. As used herein, slip speed generally refers to a difference between a rotational speed of a driving member and a rotational speed of a driven member. Slip speed error generally refers to a difference between an expected or calculated slip speed and an actual or measured slip speed.

An input torque determination module 502 periodically determines a current torque input to the input shaft 120 (transmission input torque) based on the drive torque output by the powerplant 102. The input torque determination module 502 receives the drive torque signal 310 from the PCM 110 and determines the current transmission input torque based on the drive torque signal 310. The input torque determination module 502 outputs the current transmission input torque in a transmission input torque signal 504. The transmission input torque may account for a static input torque and an inertial input torque. During steady-state operation of the DCT 104, the inertial input torque may be negligible, and may be zero.

A gear module 506 periodically determines a current gear ratio in which the DCT 104 is operating based on the positions of the gear sets 210, 212. The gear module 506 receives the sensor signals 322 from the position sensors 320 and determines the current gear ratio based on the sensor signals 322. The gear module 506 generates a gear signal 508 indicative of the current gear ratio.

A target slip speed module 510 periodically determines a current target slip speed of the engaged one of the C1 and C2 clutches 130, 132, which may be referred to as the engaged clutch. Generally, the target slip speed will be a relatively small slip speed at which excess heat will not be generated by the engaged clutch. Target slip speeds can be predetermined, for example, during a calibration phase of transmission design, based on transmission testing by varying transmission slip and one or more transmission operating parameters. The predetermined target slip speeds can be stored in memory tables for retrieval based on one or more of the operating parameters. According to the present non-limiting example, the target slip speed module 510 determines the current target slip speed based on the current gear ratio, the current transmission input torque, and the current transmission input shaft speed. The target slip speed module 510 receives the gear signal 508, the transmission input torque signal 504, and the TISS signal 326, and determines the current target slip speed based on the signals received. The target slip speed module 510 retrieves the current target slip speed from a memory table of the memory module 140 based on the current gear ratio, the current transmission input torque, and the current transmission input shaft speed. The target slip speed module 510 outputs the current target slip speed in a target slip speed signal 512.

A slip speed determination module 514 periodically estimates a current slip speed of the engaged clutch based on the current gear ratio, the current transmission input shaft speed, and the current transmission output shaft speed. The slip speed determination module 514 receives the gear signal 508, the TISS signal 326, and the TOSS signal 330, and determines the current slip speed based on the signals received. In alternate implementations, the current slip speed may be measured directly by measuring a rotational speed of the first and second intermediate input shafts 202, 204. The slip speed determination module 514 outputs the current estimated slip speed in an estimated slip speed signal 516.

A slip speed error module 518 periodically determines a current slip speed error based on a difference between the current target slip speed and the current estimated slip speed. According to the present non-limiting example, the slip speed error module 518 calculates the current slip speed error by mathematically subtracting the current target slip speed from the estimated slip speed. Accordingly, positive slip speed errors result when the current estimated slip speed is greater than the current target slip speed. Negative slip speed errors result when the current estimated slip speed is less than the current target slip speed. The slip speed error module 518 outputs the current slip speed error in a slip speed error signal 520.

A clutch torque determination module 522 periodically determines a current feed forward clutch torque based on the current transmission input torque. The clutch torque determination module 522 receives the current transmission input torque via the transmission input torque signal 504 and determines the current feed forward clutch torque based on the signal received. Generally, the feed forward clutch torque will be an estimated torque capacity of the engaged clutch at which the target slip speed can be achieved. According to the present non-limiting example, the clutch torque determination module 522 sets the current feed forward clutch torque equal to the current transmission input torque. The clutch torque determination module 522 outputs the current feed forward clutch torque in a feed forward clutch torque signal 524.

Figure 6:
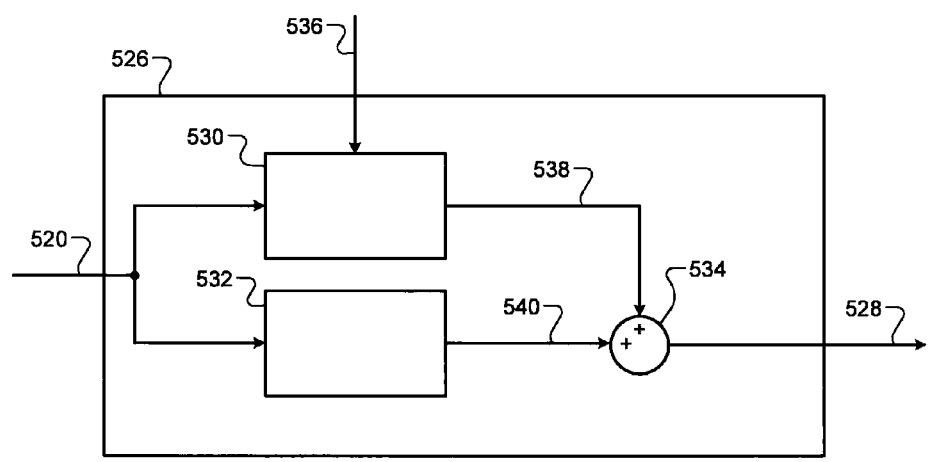
FIG. 6 is a functional block diagram illustrating an exemplary slip speed error control module according to the present disclosure.

A slip speed error control module 526 periodically determines a current clutch torque correction based on the current slip speed error and, more particularly, a mathematical integral of the slip speed error. The slip speed error control module outputs the current clutch torque correction in a clutch torque correction signal 528. With particular reference to FIG. 6, a functional block diagram illustrates an exemplary implementation of the slip speed error control module 526. The slip speed error control module 526 includes an integral gain module 530, a proportional gain module 532, and a summing module 534. The integral gain module 530 receives the slip speed error signal 520 and periodically determines an adjusted slip speed error integral gain ($T_{IA}$). The integral gain module 530 first determines a slip speed error integral ($T_I$) by mathematically integrating the slip speed error every predetermined period or control loop. According to the present non-limiting example, the slip speed error integral ($T_I$) is determined according to the following equation:

$$T_I = \Sigma(K1 \times n),$$

where K1 is a predetermined first scalar parameter and n is the current slip speed error. The first scalar parameter (K1) can be predetermined to provide a desired slip speed error control performance. According to the above equation, a current slip speed error integral is equal to the sum of a previous slip speed error integral and a product of the first scalar parameter (K1) and the current slip speed. The integral gain module 530 then determines the adjusted slip speed error integral gain ($T_{IA}$) by mathematically adding a final integral adjustment quantity ($F\Delta T_I$) to the current slip speed error integral ($T_I$). The integral gain module 530 receives the final integral adjustment quantity ($F\Delta T_I$) via a final integral adjustment signal 536. The final integral adjustment quantity ($F\Delta T_I$) accounts for adjustments made to the T2P offset points as discussed in further detail below. The integral gain module 530 outputs the current adjusted slip speed error integral gain ($T_{IA}$) in an adjusted integral gain signal 538.

The proportional gain module 532 periodically determines a slip speed error proportional gain ($T_P$) based on the current slip speed error. According to the present non-limiting example, the slip speed error proportional gain ($T_P$) is determined according to the following equation:

$$T_P = K2 \times n,$$

Where K2 is a second scalar parameter and n is the current slip speed error. Together with the first scalar parameter (K1), the second scalar parameter (K2) can be predetermined to provide a desired slip speed error control performance. The proportional gain module 532 outputs the current slip speed error proportional gain ($T_P$) in a proportional gain signal 540. The summing module 534 receives the integral and proportional gain signals 538, 540 and determines the clutch torque correction by mathematically adding the adjusted slip speed error integral gain ($T_{IA}$) and the slip speed error proportional gain ($T_P$). The summing module 534 outputs the sum ($T_{IA}+T_P$) as the current clutch torque correction in the clutch torque correction signal 528.

Referring again to FIG. 5, a clutch torque command module 542 receives the feed forward clutch torque and clutch torque correction signals 524, 528 and periodically determines a current commanded clutch torque based on the signals received. According to the present non-limiting example, the current commanded clutch torque is determined by mathematically summing the current feed forward clutch torque and the current clutch torque correction. The clutch torque command module 542 outputs the sum as the current commanded clutch torque in a clutch torque command signal 544.

A CI temperature module 546 periodically determines a current CI temperature of the C1 and C2 clutches 130, 132 based on one or more operating conditions during periods when C1 and C2 clutches 130, 132 are engaged and disengaged. The CI temperature module 546 outputs the current CI temperature in a CI temperature signal 548. According to the present non-limiting example, the current CI temperature is obtained from a predetermined thermodynamic model defining a relationship between CI temperature and various operating parameters. The thermodynamic model is implemented by an equation expressing CI temperature as a function of various operating parameters. In alternate implementations, the thermodynamic model may be implemented in memory tables.

The operating parameters include, but are not limited to, clutch torque, clutch slip speed, and transmission temperature. The thermodynamic model may be predetermined, for example, during a development phase of transmission design, based on a combination of empirical equations, computer modeling techniques, and/or transmission testing over various ranges in various clutch operating parameters. The CI temperature module 546 receives various signals, including the transmission temperature signal 334, the estimated slip speed signal 516, and the clutch torque command signal 544. The CI temperature module 546 determines the current CI temperature based on the current transmission temperature, the current clutch torque command, and the current estimated slip speed.

A clutch position determination module 550 periodically determines the C1 and C2 clutch control values input to the C1 and C2 actuator modules 302, 304 for operating the DCT 104 in the desired gear ratio. The clutch control values include a current C1 clutch position and a current C2 clutch position. The clutch position determination module 550 outputs the clutch control values to engage the C1 clutch 130 and disengage the C2 clutch 132 when the gear ratio is one of the first gear, the third gear, the fifth gear, and the seventh gear. The clutch position determination module 550 outputs the clutch control values to engage the C2 clutch 132 and disengage the C1 clutch 130 when the gear ratio is one of the second gear, the fourth gear, the sixth gear, and the reverse gear. During steady-state operation of the DCT 104 in the desired gear ratio, the clutch position determination module 550 determines the clutch control value for the engaged clutch from the corresponding T2P memory table of the memory module 140. According to the present non-limiting example, the clutch control value is determined by interpolating between points defined by the nearest two of the T2P curves 404, 406, 408 in the T2P memory table for the engaged clutch.

Referring again to FIG. 4, the determination of the clutch control value will be described in further detail with reference to an operating point 556 where the current CI temperature is between the nominal reference CI temperature (T2) of the T2P curve 406 and the hot reference CI temperature (T3) of the T2P curve 408. First, the appropriate T2P memory table for the engaged clutch is selected. Next, the nearest two of the T2P curves 404, 406, 408 are identified based on the current CI temperature. According to the present example, the T2P curves 406, 408 are selected as the nearest two T2P curves. Next, a first point 558 along the T2P curve 406 and a second point 560 along the T2P curve 408 are determined based on the current clutch torque command. When the current clutch torque command is greater than the respective T2P offset points 442, 444, the first and second T2P points 558, 560 are determined based on the T2P offset points 442, 442 and the T2P gains 452, 454. The first point 558 defines a first clutch position (P1) at the nominal reference CI temperature (T2). The second point 560 defines a second clutch position (P2) at the hot reference CI temperature (T3). A desired clutch position (P3) representing the clutch control value is determined by linearly interpolating between the first and second T2P points 558, 560. Accordingly: the desired clutch position (P3) may be calculated using the following equation:

$$P3 = P1 + (P2-P1) \times (TCI-T2)/(T3-T2),$$

where P3 is the clutch control value and TCI is the current CI temperature. Clutch positions within the non-linear operating ranges 412 are determined similarly by interpolation using the non-linear equations fit between the T2P engagement point 430 and the T2P offset points 442, 444.

Referring again to FIG. 5, a parameter control module 570 receives the adjusted slip speed error integral gain ($T_{IA}$) from the slip speed error control module 526 via the adjusted integral gain signal 538. The parameter control module 570 selectively adjusts one or more of the T2P offset points 440, 442, 444 based on the slip speed error integral ($T_I$) represented in the adjusted slip speed error integral gain ($T_{IA}$). The parameter control module 570 further determines the final integral adjustment quantity ($F\Delta T_I$) to account for adjustments made to one or more of the T2P offset points 440, 442, 444. The parameter control module 570 outputs the final integral adjustment quantity ($F\Delta T_I$) in the final integral adjustment signal 536.

Figure 7:
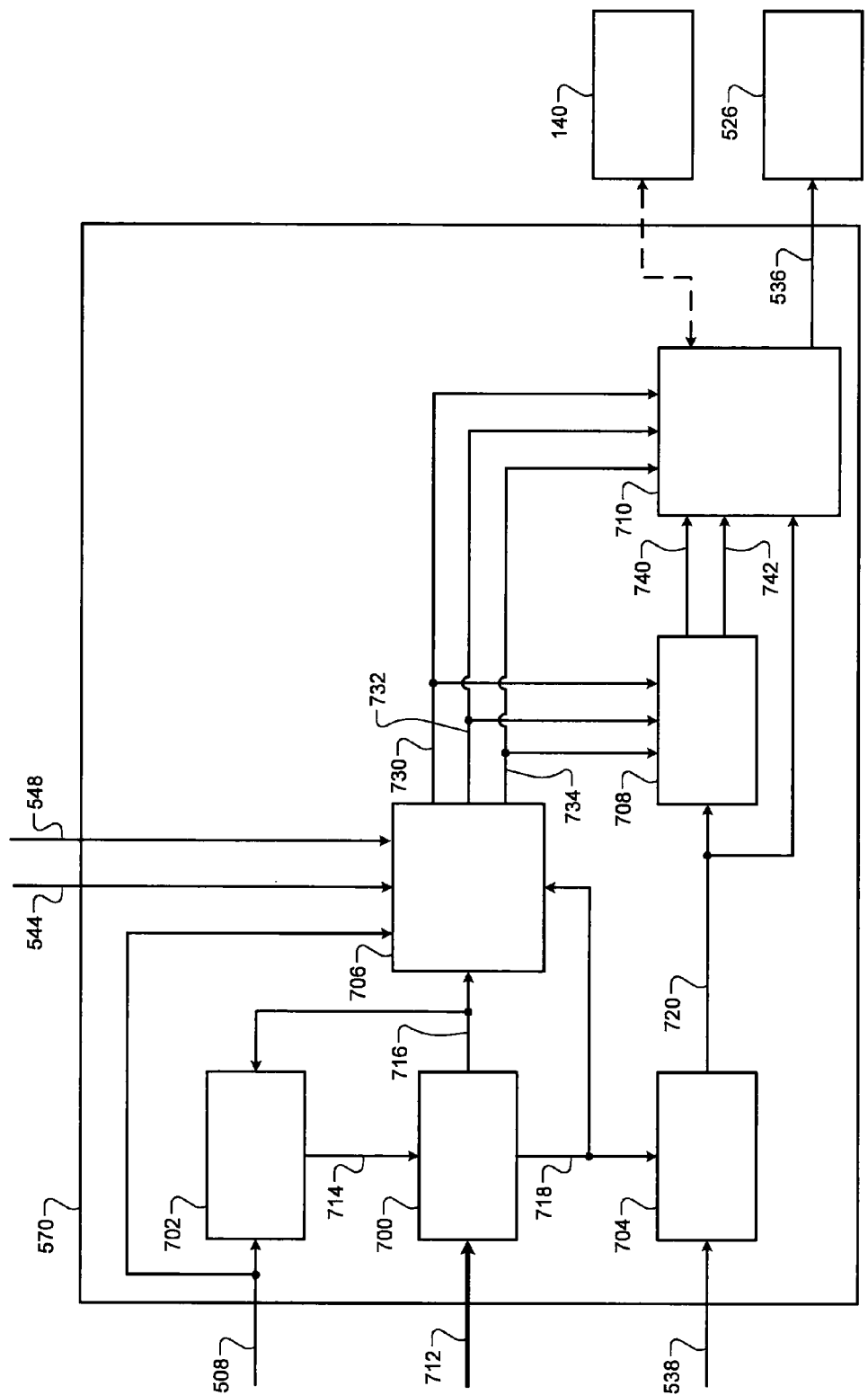
FIG. 7 is a functional block diagram illustrating an exemplary parameter control module according to the present disclosure.

With particular reference to FIG. 7, an exemplary implementation of the parameter control module 570 is presented. The parameter control module 570 includes a monitoring module 700, a timer module 702, an adjustment determination module 704, an index determination module 706, an apportioning module 708, and an adjustment module 710. The monitoring module 700 monitors various signals 712 to determine whether parameter adjustment enabling conditions are met. Generally, the parameter adjustment enabling conditions provide criteria for ensuring that suitable adjustments will be made. The parameter adjustment enabling conditions include general enabling conditions and parameter-based enabling conditions. According to the present non-limiting example, the parameter adjustment enabling conditions are met when the general enabling conditions and the parameter-based enabling conditions are all continually met for a predetermined period.

The general enabling conditions are met when 1) parameter adjustment is active; 2) slip control is active; 3) the DCT 104 is operating at a steady state; and 4) no intrusive transmission operations or diagnostic operations are active. The parameter-based enabling conditions are met when 5) an elapsed time or period since last shift is greater than a predetermined period; 6) the current transmission input shaft speed is within a predetermined speed range; 7) the estimated clutch slip is within a predetermined slip speed range; 8) the current feed forward clutch torque is greater than a predetermined lower linear torque threshold; 9) adjusted slip speed error integral gain is greater than a predetermined positive gain or less than a predetermined negative gain; 10) a variation in the clutch torque command, or difference between a maximum clutch torque command and a minimum clutch torque command since the DCT 104 shifted into the current gear is less than a predetermined difference; 11) a variation in the transmission input torque, or difference between a maximum transmission input torque and a minimum transmission input torque since the DCT shifted into the current gear is less than a predetermined difference; and 12) an elapsed time or period since a last parameter update in the current gear is greater than a predetermined update period.

Accordingly, the signals 712 may include, but are not limited to, the signals 326, 504, 516, 524, 538, 572. The signals received further include elapsed time signals 714 indicative of the elapsed time since last shift and the elapsed time since the last parameter update. The monitoring module 700 informs the timer module 702 and the index determination module 706 when the parameter adjustment enabling conditions are met via an enablement signal 716. The monitoring module 700 further informs the index determination module 706 and the adjustment determination module 704 when the parameter adjustment enabling conditions have been met for the predetermined period via a validation signal 718.

The timer module 702 receives various signals including the gear signal 508 and the enablement signal 716 and determines various elapsed times based on the signals received. The timer module 702 determines the elapsed time since last shift based on the gear signal 508 and the elapsed time since the parameter adjustment enabling conditions are met based on the enablement signal 716. The timer module 702 also communicates with the index determination module 706 and the adjustment module 710 via signals (not shown) to determine the elapsed time since the last parameter update to the T2P memory table in which the engaged clutch is operating.

The adjustment determination module 704 receives various signals, including the adjusted integral gain signal 538 and the validation signal 718 and determines an initial integral adjustment quantity ($I\Delta T_I$) based on the signals received. The adjustment determination module 704 outputs the initial integral adjustment quantity ($I\Delta T_I$) in an initial integral adjustment signal 720. The initial integral adjustment quantity ($I\Delta T_I$) is based on a validated integral quantity ($T_{IV}$). The validated integral quantity ($T_{IV}$) is a value of the adjusted slip speed error integral gain ($T_{IA}$) when the validation signal 718 indicates the parameter adjustment enabling conditions have been met for the predetermined period. The initial integral adjustment quantity ($I\Delta T_I$) determines an amount by which one or more T2P curves are adjusted by the adjustment module 710, as discussed in further detail below. Generally, the initial integral adjustment quantity ($I\Delta T_I$) will be less than the validated integral quantity ($T_{IV}$). According to the present non-limiting example, the initial integral adjustment quantity ($I\Delta T_I$) is determined according to the following equation:

$$I\Delta T_I = K3 \times T_{IV},$$

where K3 is a single predetermined third scalar less than one. In alternate implementations, the third scalar (K3) may be based on, for example, the clutch index number. The third scalar (K3) may be predetermined, for example, during a calibration phase of transmission design, to prevent hunting and over correction during periods when the T2P curves are adjusted by the adjustment module 710. In various implementations, a value of around zero point five (0.5) may be a suitable value for the third predetermined scalar (K3).

The index determination module 706 receives various signals, including the gear signal 508, the clutch torque command signal 544, the CI temperature signal 548, and the validation signal 718. The index determination module 706 monitors the current gear, the clutch torque command, and the CI temperature during a validation period. The validation period begins when the parameter adjustment enabling conditions are first met and ends when the parameter adjustment enabling conditions have been met for the predetermined period. The index determination module 706 identifies the clutch index number of the T2P memory table used to control the engaged clutch during the validation period. The index determination module 706 generates a clutch index signal 730 indicative of the clutch index number.

The index determination module 706 further identifies a primary T2P curve and a secondary T2P curve based on the CI temperature during the validation period. The index determination module 706 outputs signals 732, 734, indicative of the identities of the primary T2P curve and the secondary T2P curve, respectively. The primary T2P curve is the T2P curve whose reference CI temperature (e.g., T1, T2, T3) is closest to the CI temperatures during the validation period. The secondary T2P curve is the T2P curve whose reference CI temperature is the next closest to the CI temperatures during the validation period. In various implementations, the parameter-based enabling conditions can be set to ensure that a minimum CI temperature and a maximum CI temperature of the engaged clutch during the validation period will remain closest to the same two T2P curves. Referring again to FIG. 4, the operating point 556 is closest to the T2P curve 406, which is the primary T2P curve. The curve 408 is the next closest T2P curve and is the secondary T2P curve.

The apportioning module 708 receives various signals, including the initial integral adjustment signal 720, the clutch index signal 730, and the primary and secondary T2P curve signals 732, 734. The apportioning module 708 determines a primary T2P curve torque adjustment quantity (PT$\Delta$T2P) and a secondary T2P curve torque adjustment quantity (ST$\Delta$T2P). The apportioning module 708 outputs the primary T2P curve torque adjustment quantity (PT$\Delta$T2P) and the secondary T2P curve torque adjustment quantity (ST$\Delta$T2P) in a primary adjustment signal 740 and a secondary adjustment signal 742. The primary and secondary T2P curve adjustment quantities are determined according to the following equations:

$$PT\Delta T2P = K4 \times I\Delta T_I, \text{ and}$$

$$ST\Delta T2P = K5 \times I\Delta T_I,$$

where K4 and K5 are apportioning scalars that apportion the initial integral adjustment quantity ($I\Delta T_I$) to the primary and secondary T2P curve adjustment quantities (PT$\Delta$T2P and ST$\Delta$T2P), respectively. According to the present non-limiting example, the apportioning scalars K4 and K5 are based on the CI temperatures during the validation period and apportion the initial integral adjustment quantity ($I\Delta T_I$) in a weighted manner. More specifically, the apportioning scalars K4 and K5 are based on a weighted average of the CI temperatures during the validation period and may be determined as a function of the weighted average CI temperature and the reference CI temperatures as illustrated by the following equations:

$$K4 = \text{function}(|RCIT_S - CIT_{WA}|, |RCIT_P - RCIT_S|), \text{ and}$$

$$K5 = \text{function}(|RCIT_P - CIT_{WA}|, |RCIT_P - RCIT_S|),$$

where $CIT_{WA}$ is the weighted average CI temperature, $RCIT_P$ is the reference CI temperature of the primary T2P curve, and $RCIT_S$ is the reference CI temperature of the secondary T2P curve.

The adjustment module 710 receives signals including the signals 730, 732, 734, 740, 742 and determines a primary T2P curve position adjustment quantity (PP$\Delta$T2P) and a secondary T2P curve position adjustment quantity (SP$\Delta$T2P) based on the signals received. The primary T2P curve position adjustment quantity (PP$\Delta$T2P) is based on primary T2P curve torque adjustment quantity (PT$\Delta$T2P) and the secondary T2P curve position adjustment quantity (SP$\Delta$T2P) is based on the secondary T2P curve torque adjustment quantity (ST$\Delta$T2P). According to the present non-limiting example, the primary T2P curve position adjustment quantity (PP$\Delta$T2P) is determined based on the following equation:

$$PP\Delta T2P = PT\Delta T2P / PT2PGAIN,$$

where PT2PGAIN is the last T2P gain (e.g., T2P gains 450, 452, 454) stored in the memory module 140 for the primary T2P curve. If the primary T2P curve position adjustment quantity (PP$\Delta$T2P) is greater than a predetermined primary positive adjustment quantity or is less than a predetermined primary negative adjustment quantity, then the primary T2P curve adjustment position quantity (PPΔT2P) is adjusted to the respective primary positive or negative adjustment quantity. In this way, adjustments to the primary T2P curve may be limited. The secondary T2P curve position adjustment quantity (SPΔT2P) is determined based on the following equation:

$$SP\Delta T2P = ST\Delta T2P/ST2PGAIN,$$

where ST2PGAIN is the last T2P gain (e.g., T2P gains 450, 452, 454) stored in the memory module 140 for the secondary T2P curve. If the secondary T2P curve position adjustment quantity (SPΔT2P) is greater than a predetermined secondary positive adjustment quantity or is less than a predetermined secondary negative adjustment quantity, then the secondary T2P curve adjustment position quantity (SPΔT2P) is adjusted to the respective secondary positive or negative adjustment quantity. In this way, adjustments to the secondary T2P curve may be limited. Positive T2P curve position adjustment quantities shift the linear operating ranges 414 of the corresponding T2P curves to the right (FIG. 4) and stretch the non-linear operating ranges 412. Negative T2P curve position adjustment quantities shift the linear operating ranges 414 to the left and compress the non-linear operating ranges 412.

Once the primary and secondary T2P curve position adjustment quantities (PPΔT2P and SPΔT2P) are determined, the adjustment module 710 adjusts the T2P offset points (e.g., 440, 442, 444) of the primary and secondary T2P curves stored in the memory module 140. The adjustment module 710 stores a new primary T2P curve T2P offset point equal to a sum of the last stored primary curve T2P offset point and the primary T2P curve position adjustment quantity (PPΔT2P). The adjustment module 710 further stores a new secondary T2P curve T2P offset point equal to a sum of the last stored secondary curve T2P offset point and the secondary T2P curve position adjustment quantity (SPΔT2P). The adjustment module 710 determines and outputs the final integral adjustment quantity (FΔT$_I$) in final integral adjustment signal 536 during the same control loop as the adjustment module 710 adjusts the T2P offset points. In this way, the adjustment module 710 ensures the slip speed error integral (T$_I$) will be adjusted by the slip speed error control module 526 before the new T2P offset points are used to determine the positions of the C1 and C2 clutches 130, 132. In this way, the control loop feedback system will remain stable as the T2P characteristics are adjusted.

The final integral adjustment quantity (FΔT$_I$) output is equal to the initial integral adjustment quantity (IΔT$_I$) when the T2P curve position adjustment quantities (PPΔT2P and SPΔT2P) have not been adjusted as discussed above. When one or both the T2P curve position adjustment quantities (PPΔT2P and SPΔT2P) have been adjusted, the final integral adjustment quantity (FΔT$_I$) output is less than the initial integral adjustment quantity (IΔT$_I$). The final integral adjustment quantity (FΔT$_I$) is adjusted based on a difference between the T2P position adjustment quantities (PPΔT2P and SPΔT2P) determined directly from the initial integral adjustment quantity (IΔT$_I$) and the adjusted quantities actually used to update the memory module 140.

Figure 8:
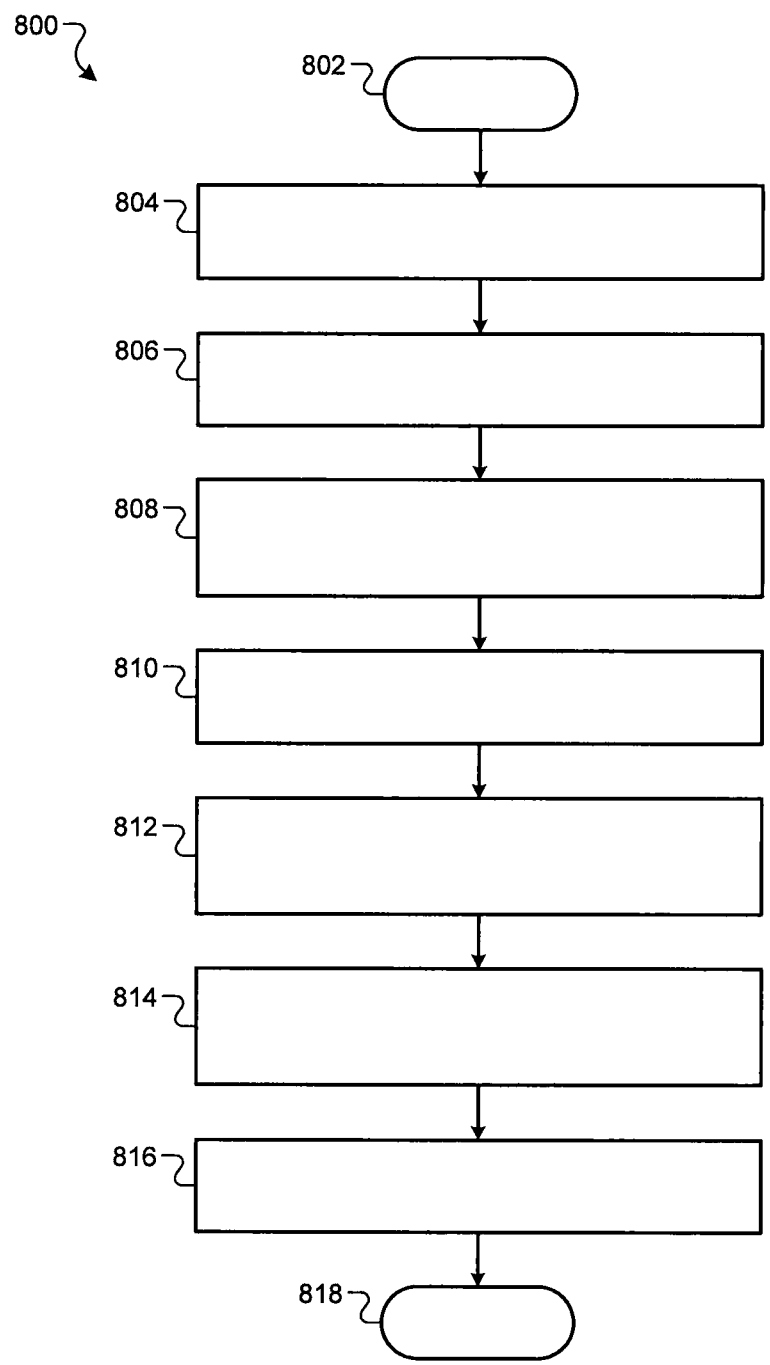
FIGS. 8-9 are flow diagrams illustrating an exemplary method for controlling a clutch in a dual-clutch transmission according to the present disclosure.
Figure 9:
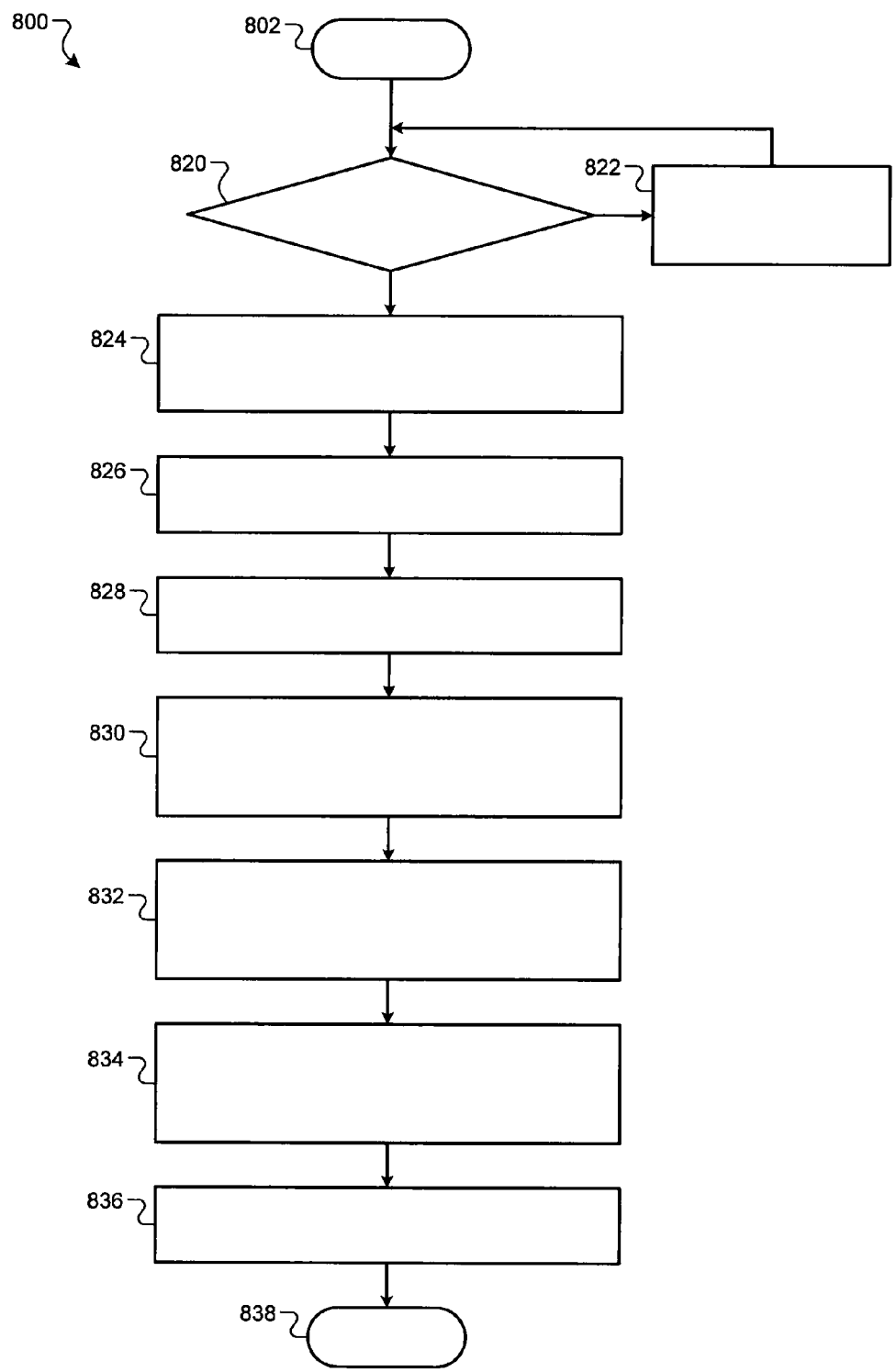

With particular reference to FIGS. 8-9, flow diagrams illustrate an exemplary method 800 for controlling a clutch in a dual-clutch transmission according to the present disclosure. The method 800 may be used, for example, to control the C1 and C2 clutches 130, 132 of the DCT 104. The method 800 may be implemented in one or more modules of a transmission control system, such as the transmission control system 300. Accordingly, the method 800 will be described with reference to the various components of the transmission control system 300. In this way, operation of the transmission control system 300 may be more fully described and understood. While the method 800 may be used to control both the C1 and C2 clutches 130, 132 at the same time, the method 800 will be described with reference to an engaged clutch, which may be either the C1 clutch 130 or the C2 clutch 132, depending on the desired gear ratio. For example, when the desired gear ratio is one of the first gear, the third gear, the fifth gear, and the seventh gear, the C1 clutch 130 is the engaged clutch. When the desired gear ratio is one of the second gear, the fourth gear, the sixth gear, and the reverse gear, the C2 clutch 132 is the engaged clutch.

A start of the method 800 begins at 802 during a period of steady-state operation of the DCT 104. Control according to the method 800 proceeds at 804-818 (FIG. 8) and at 820-838 (FIG. 9) concurrently as described below. Control at 804-818 illustrates an exemplary method of controlling the engaged clutch based on the clutch control values stored in the memory module 140. Control at 820-838 illustrates an exemplary method of updating the clutch control values stored in the memory module 140. According to the present non-limiting example, control at 804-818 and at 820-838 repeats in periodic fashion during the period of steady-state operation, as described below. Each iteration may be referred to as a control loop.

With particular reference to FIG. 8, at 804, the clutch torque determination module 522 determines a feed forward clutch torque for the current control loop based on the transmission input torque and outputs the feed forward clutch torque to the clutch torque command module 542. At 806, the slip speed error module 518 determines a slip speed error for the current control loop and outputs the slip speed error to the slip speed error control module 526. At 808, the slip speed error control module 526 determines an adjusted slip speed error integral gain (T$_{IA}$) for the current control loop and outputs the adjusted slip speed error integral gain (T$_{IA}$) to the parameter control module 570. The slip speed error control module 526 determines the adjusted slip speed error integral gain (T$_{IA}$) based on an adjusted slip speed error integral gain (T$_{IA}$) determined in a previous control loop and a final integral adjustment quantity (FΔT$_I$) received since the previous control loop. At 810, the slip speed error control module 526 determines a clutch torque correction for the current control loop based on the adjusted slip speed error integral gain (T$_{IA}$) and outputs the clutch torque correction to the clutch torque command module 542. At 812, the clutch torque command module 542 determines a clutch torque command for the current control loop based on a feed forward clutch torque and the clutch torque correction and outputs the clutch torque command to the clutch position determination module 550. At 814, the clutch position determination module 550 determines a clutch position for the current control loop from the T2P memory tables based on the clutch torque command and outputs the clutch position to the appropriate clutch actuator module for the engaged clutch (i.e., the C1 actuator module 302 or the C2 actuator module 304). At 816, the appropriate clutch actuator module adjusts the engaged clutch to the clutch position received. From 816, control returns to the start at 802 to begin another control loop of the method 800. The return to start is designated at 818.

With particular reference to FIG. 9, at 820, the parameter control module 570 determines whether the parameter adjustment enabling conditions are met. If yes, then control proceeds at 824, otherwise, control proceeds at 822 as shown. At 822, the parameter control module 570 outputs a final integral adjustment quantity (FΔT$_I$) of zero to the slip speed error control module 526 and control loops back to the start at 802 as shown to begin another control loop of the method 800. At 824, the parameter control module 570 receives the validated integral quantity ($T_{IV}$) from the slip speed error control module. The validated integral quantity ($T_{IV}$) is the adjusted slip speed error integral gain ($T_{IA}$) output by the slip speed error control module 526 during the control loop when the parameter adjustment enabling conditions are met for the predetermined period. At 826, the parameter control module 570 determines an initial integral adjustment quantity ($I\Delta T_I$) for the current control loop based on the validated integral quantity ($T_{IV}$) received.

At 828, the parameter control module 570 determines a clutch index number for a T2P memory table to be adjusted based on the T2P memory table used to control the engaged clutch during the validation period. The parameter control module 570 further determines a primary T2P curve and a secondary T2P curve of the T2P memory table based on the reference CI temperatures of the T2P curves and the CI temperatures during the validation period. At 830, the parameter control module 570 determines a primary T2P curve position adjustment quantity (PP$\Delta$T2P) for adjusting the primary T2P curve. The parameter control module 570 further determines a secondary T2P curve position adjustment quantity (SP$\Delta$T2P) for adjusting the secondary T2P curve. The primary and secondary adjustment quantities are determined based on the initial integral adjustment quantity ($I\Delta T_I$), the apportioning scalars (K4 and K5), and the adjustment limits.

At 832, the parameter control module 570 determines the final integral adjustment quantity (F$\Delta T_I$) based on the initial integral adjustment quantity ($I\Delta T_I$) and the T2P curve position adjustment quantities (PP$\Delta$T2P and SP$\Delta$T2P). The final integral adjustment quantity (F$\Delta T_I$) is equal to the initial integral adjustment quantity ($I\Delta T_I$) when both the T2P curve position adjustment quantities (PP$\Delta$T2P and SP$\Delta$T2P) are not adjusted to one of the adjustment limits. The final adjustment quantity (F$\Delta T_I$) is reduced to account for a difference between the T2P curve position adjustment quantities (PP$\Delta$T2P and SP$\Delta$T2P) determined directly from the initial integral adjustment quantity ($I\Delta T_I$) and the adjusted quantities actually determined at 830.

At 834, the parameter control module 570 replaces T2P offsets of the primary and secondary T2P curves stored in the memory module 140 with new T2P offsets adjusted by the corresponding T2P curve position adjustment quantities (PP$\Delta$T2P and SP$\Delta$T2P). At 836, the parameter control module 570 outputs the final integral adjustment quantity (F$\Delta T_I$) determined at 832 to the slip speed error control module 526 to adjust the slip speed error integral during the same control loop as the parameter control module 570 stores the new T2P offsets. From 836, control returns to the start at 802 to begin another control loop of the method 800. The return to start is designated at 838.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a transmission, comprising:
   a memory module that stores a control value as a function of clutch torque;
   a position module that controls a position of a clutch based on said control value;
   an error module that periodically determines a slip speed error based on a difference between a target slip speed and an estimated slip speed of said clutch;
   an integral module that periodically determines an integral of said slip speed error; and
   an adjustment module that adjusts said control value based on said integral.

2. The control system of claim 1, wherein said control value is stored as a function of clutch torque and a clutch parameter other than clutch torque.

3. The control system of claim 2, wherein said clutch parameter is clutch interface temperature.

4. The control system of claim 1, wherein said adjustment module adjusts said control value based on a value of said integral when a predetermined operating condition is met for a predetermined period.

5. The control system of claim 4, wherein said operating condition specifies one of a clutch slip speed range, a clutch torque range, and a transmission input torque range.

6. The control system of claim 1, wherein:
   said memory module stores (i) a first control value as a function of clutch torque and a clutch parameter other than clutch torque and (ii) a second control value as a function of clutch torque and said clutch parameter, said second control value being different than said first control value, and second control value based on (i) a value of said integral when a predetermined
   said adjustment module adjusts at least one of said first control value and said operating condition is met for a predetermined period and (ii) an estimated value of said clutch parameter during said period.

7. The control system of claim 6, wherein:
   said first control value is stored as a function of a first reference value, and said second control value is stored as a function of a second reference value different than said first reference value, and
   said adjustment module adjusts said first control value and said second control value based on a difference between (i) said estimated value and (ii) one of said first reference value and said second reference value.

8. The control system of claim 1, wherein said adjustment module adjusts said control value when a value of said integral is greater than a predetermined value.

9. The control system of claim 1, wherein said adjustment module adjusts said control value by a first quantity, and wherein said adjustment module adjusts said integral by a second quantity based on said first quantity.

10. The control system of claim 1, wherein said control value corresponds to a linear operating range of said clutch.

11. A method for controlling a transmission, comprising:
    storing a control value as a function of clutch torque;
    controlling a position of a clutch based on said control value;
    periodically determining a slip speed error based on a difference between a target slip speed and an estimated slip speed of said clutch;
    periodically determining an integral of said slip speed error; and
    adjusting said control value based on said integral.

12. The method claim 11, further comprising storing said control value as a function of a clutch parameter other than clutch torque.

13. The method of claim 12, wherein said clutch parameter is clutch interface temperature.

14. The method of claim 11, further comprising adjusting said control value based on a value of said integral when a predetermined operating condition is met for a predetermined period.

15. The method of claim 14, wherein said operating condition specifies one of a clutch slip speed range, a clutch torque range, and a transmission input torque range.

16. The method of claim 11, further comprising:
storing a first control value as a function of clutch torque and a clutch parameter other than clutch torque;
storing a second control value as a function of clutch torque and said clutch parameter, said second control value being different than said first control value; and
adjusting at least one of said first control value and said second control value based on (i) a value of said integral when a predetermined operating condition is met for a predetermined period and (ii) an estimated value of said clutch parameter during said period.

17. The method of claim 16, further comprising:
storing said first control value as a function of a first reference value;
storing said second control value as a function of a second reference value different than said first reference value; and
adjusting said first control value and said second control value based on a difference between (i) said estimated value and (ii) one of said first reference value and said second reference value.

18. The method of claim 11, further comprising adjusting said control value when a value of said integral is greater than a predetermined value.

19. The method of claim 11, further comprising:
adjusting said control value by a first quantity; and
adjusting said integral by a second quantity based on said first quantity.

20. The method of claim 11, wherein said control value corresponds to a linear operating range of said clutch.

* * * * *